United States Patent [19]

Camus

[11] Patent Number: 5,072,895
[45] Date of Patent: Dec. 17, 1991

[54] CARGO PLATFORM ASSEMBLY MOUNTED TO A HELICOPTER

[76] Inventor: Mark Camus, 9301 SW. 92nd Ave., B104, Miami, Fla. 33176

[21] Appl. No.: 548,257

[22] Filed: Jul. 5, 1990

[51] Int. Cl.⁵ ............................ B64C 1/20; B60R 9/45
[52] U.S. Cl. ............................ 244/118.1; 244/137.4; 224/42.44
[58] Field of Search ............ 244/137.3, 137.4, 118.1, 244/118.2, 137.2; 224/42.41, 42.42, 42.43, 42.44; 182/142, 145, 146, 148, 149, 150

[56] References Cited

U.S. PATENT DOCUMENTS

| | | | |
|---|---|---|---|
| 3,778,011 | 12/1973 | Cannon | 224/42.41 X |
| 3,904,155 | 9/1975 | Chavis | 244/137.2 X |
| 4,440,364 | 4/1984 | Cone et al. | 244/129.6 |
| 4,637,575 | 1/1987 | Yenzer | 244/118.1 X |

*Primary Examiner*—Joseph F. Peters, Jr.
*Assistant Examiner*—Virna Lissi Mojica
*Attorney, Agent, or Firm*—Malloy, Downey & Malloy

[57] ABSTRACT

A cargo and work platform assembly adapted to be mounted to at least one of two longitudinally extending skid tubes beneath a helicopter fuselage wherein a plurality of support struts including inboard support struts and outboard support struts extend in supporting, connecting relation between the platform and the fuselage. In a preferred embodiment, the platform assembly includes two independent platforms separably mounted to one of the two longitudinal skid tubes in such a manner as to allow lateral displacement of the skid tubes upon landing or takeoff.

21 Claims, 3 Drawing Sheets

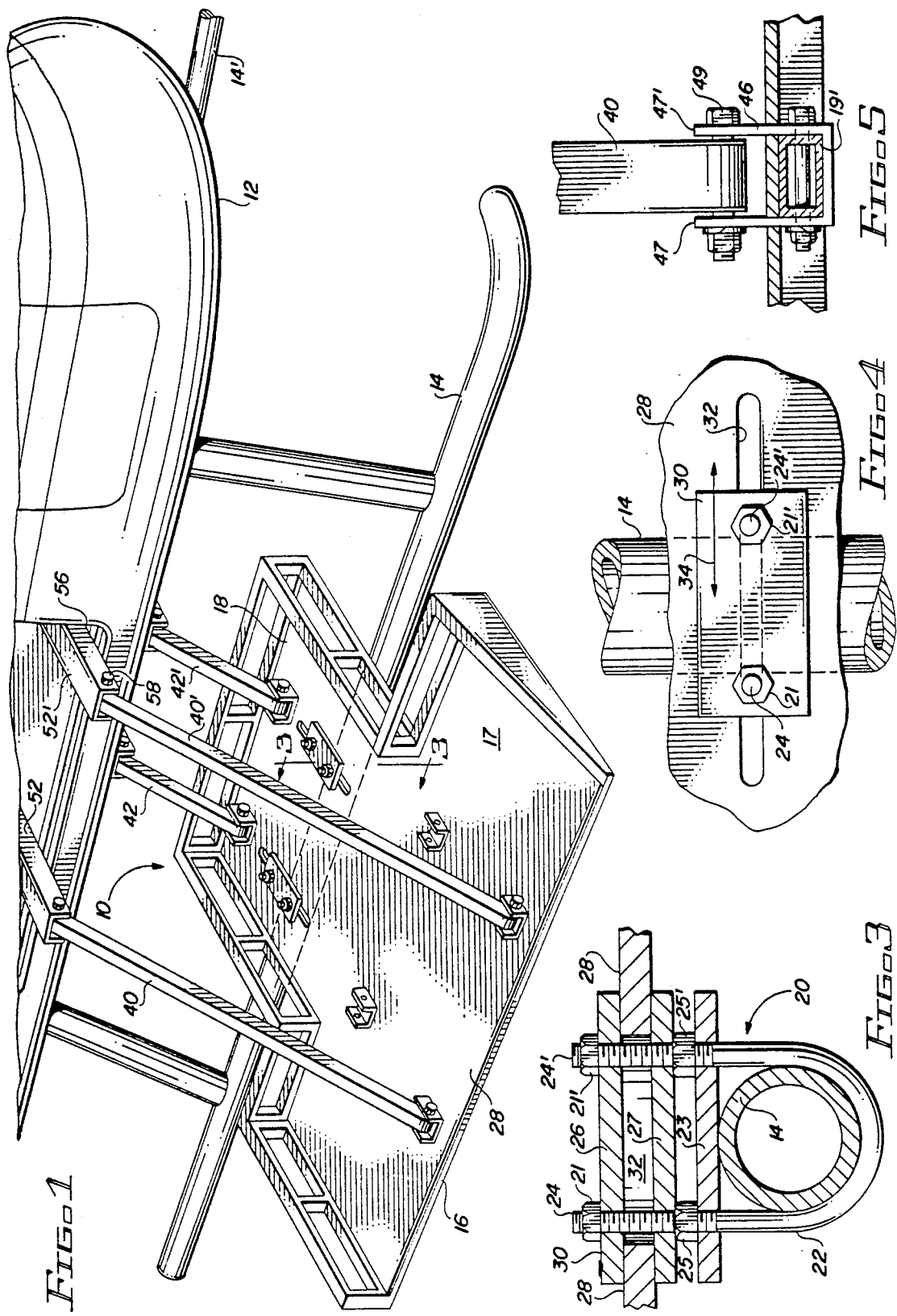

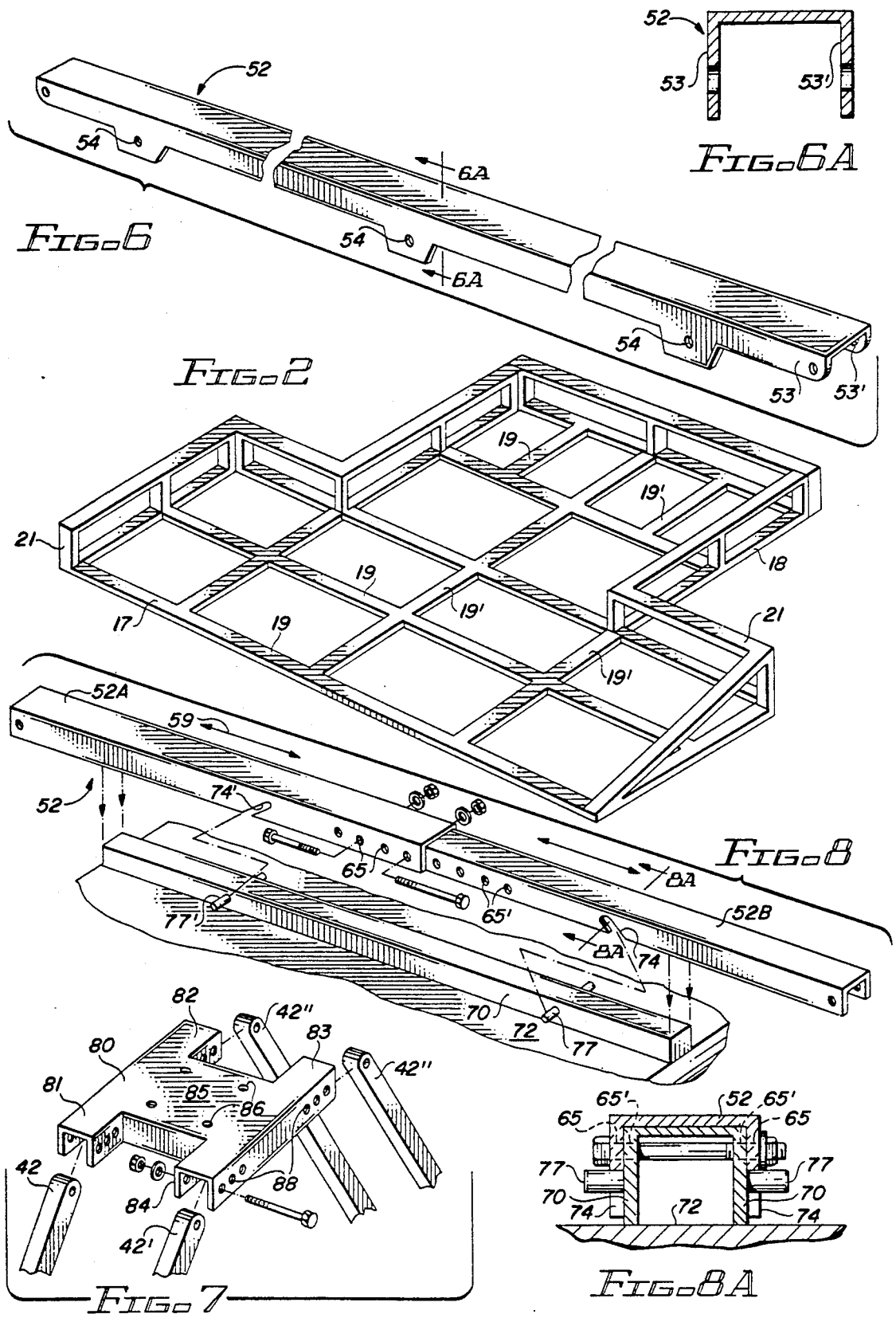

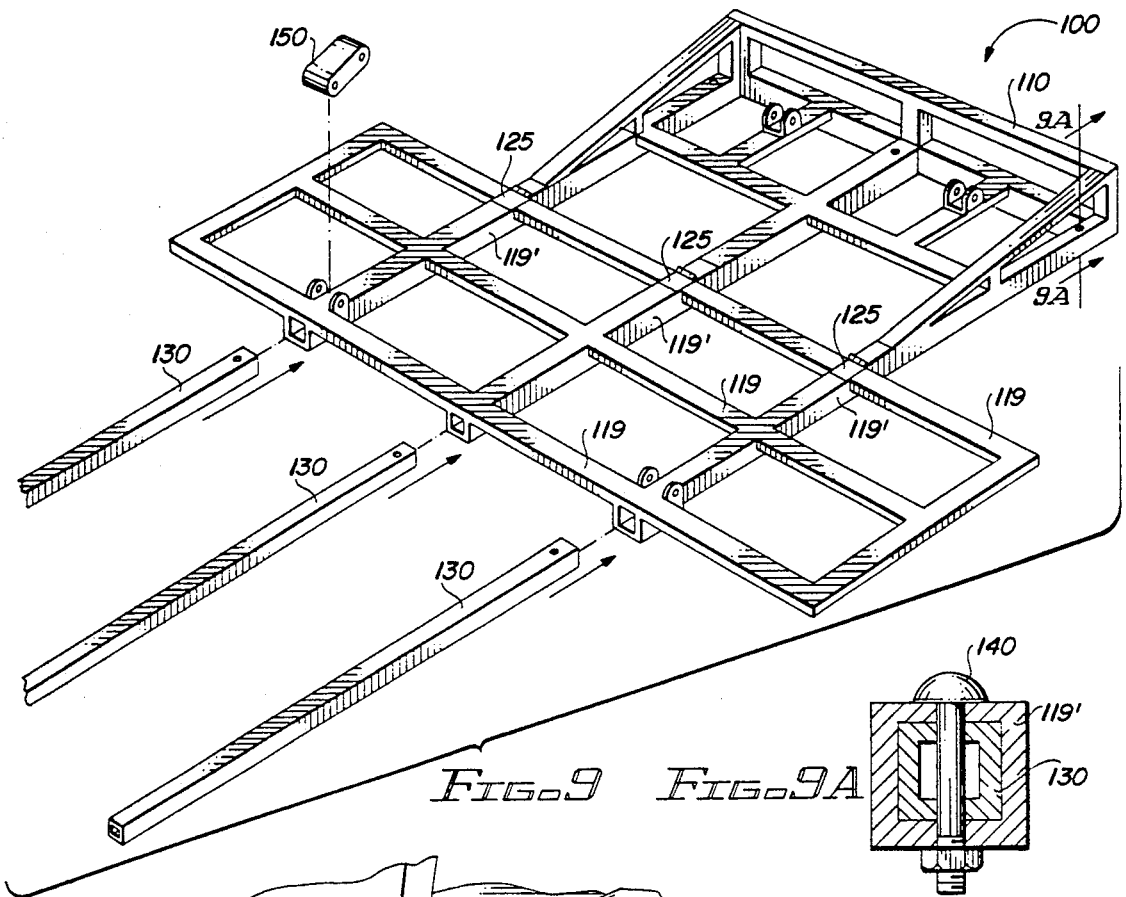
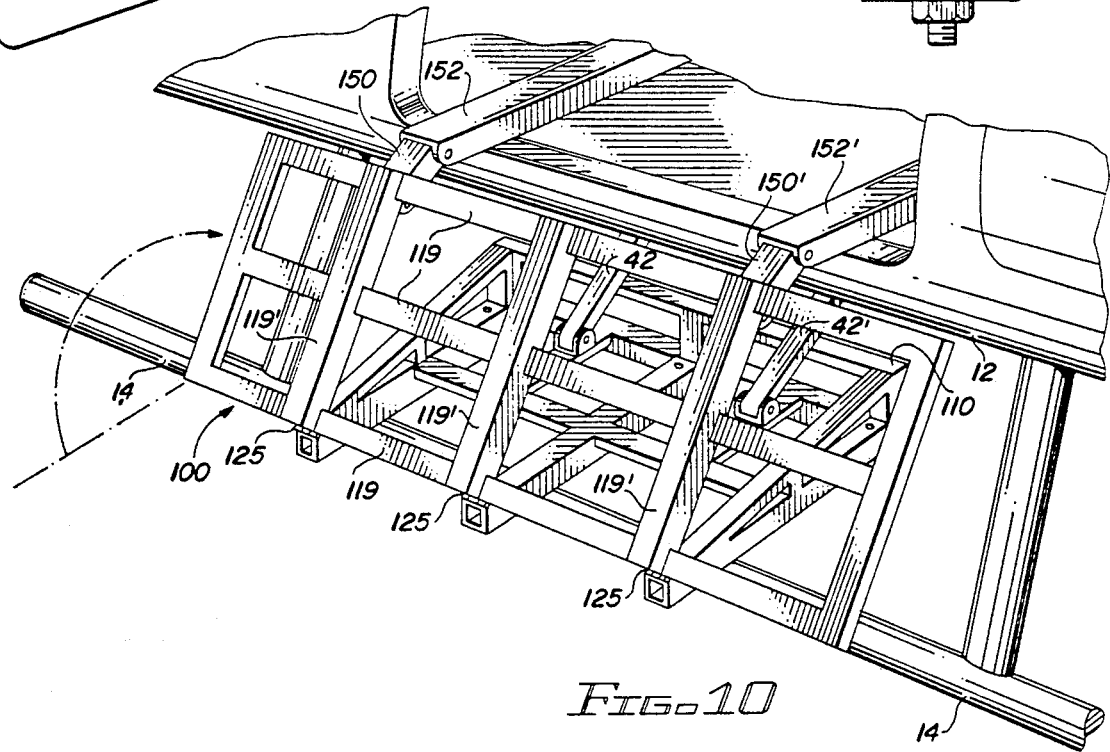

CARGO PLATFORM ASSEMBLY MOUNTED TO A HELICOPTER

BACKGROUND OF THE INVENTION

1. Field of the Invention

The present invention relates to a cargo platform assembly including at least one platform structure designed to be removably mounted to a longitudinally extending skid tube beneath a helicopter fuselage wherein lateral movement of the skid tube, in relation to the platform, is provided.

2. Description of the Prior Art

The use of helicopters for purposes other than just transport of passengers is becoming extremely common, especially in industries requiring the use of helicopters for transporting cargo or performing certain maintenance and repair work. Because the interior space within the helicopter's cabin is generally limited, the additional unused space on the exterior of the aircraft between the fuselage and the supporting skid tube assembly is commonly used to mount an exterior load supporting structure, such as a basket or platform. Therefore, because of the limitations of the interior space within the helicopter, and further in view of the fact that most helicopters have sufficient power to carry additional weight or cargo, it is often desired to carry relatively bulky items or extra cargo on the exterior of the helicopter in order to maximize the cargo carrying capacity. Additionally, it is often necessary to carry personnel on the exterior of the helicopter for performing certain tasks and duties, such as may be necessary during military operations, law enforcement, air rescue, or industrial maintenance and repair work.

In an attempt to provide such additional capabilities on a helicopter, several attempts have been made in the prior art to secure some type of external load supporting device to the skid assembly of the helicopter in such a manner which will not substantially interfere with the normal operation of the helicopter and attached skid assembly during takeoff, flight and landing of the helicopter. Many of these external load supporting structure in the prior art were specifically designed to support workmen or other personnel on the exterior of the helicopter to perform certain duties.

The following U.S. Patents are generally representative of the closest prior art structures related to the attachment of some type of external load supporting structure adapted for attachment to the exterior structure of the helicopter, and primarily to the skid assembly. The patent to Chavis, U.S. Pat. No. 3,904,155 is directed to a helicopter step and cargo carrying assembly adapted to be connected directly to the landing gear cross tubes extending down from the helicopter fuselage to the horizontal skid tubes. The step and cargo assembly, as disclosed in Chavis, is only supported by clamps which clamp the assembly directly to the downwardly extending landing gear cross tubes. This type of mounted connection substantially limits the weight carrying capacity of the step assembly due to the tendency of the clamps to slide down the length of the skid tube supports upon applying a sufficient force to the load supporting surface. Additionally, the strength of the clamps used in Chavis limits the cargo carrying capacity.

U.S. Pat. No. 4,637,575 to Yenzer discloses a helicopter air-mobile work platform specifically designed for working on power lines and associated tower structures. The work platform in Yenzer primarily comprises a rectangular base having a length extending a greater distance than the distance between the helicopter skid tubes such that the platform extends transversely below the helicopter fuselage across the skid tubes with a portion projecting outwardly from each of the skid tubes. While the platform in Yenzer sufficiently utilizes the space below the helicopter fuselage between the longitudinally extending skid tubes, there is still very little cargo carrying capacity outboard of the skid tubes. Additionally, the transverse orientation of the platform in Yenzer creates substantial resistance or drag during forward flight.

Regardless of the various external load supporting structures present in the prior art as generally represented by the above-noted patents, there is still a need for an efficient and effective external load supporting structure which provides for a maximum cargo carrying capacity outboard of the skid tubes which is easily accessible and additionally functions as a work platform being structured and disposed in such a manner as to support a maximum weight while minimizing the amount of drag on the aircraft during normal flight.

SUMMARY OF THE INVENTION

The present invention is directed towards a cargo and work platform adapted to be mounted to the external structure of a helicopter and more specifically, to the longitudinally extending skid tubes beneath the helicopter fuselage. The work and platform assembly includes at least one platform adapted to be mounted to one of the two oppositely disposed skid tubes in such a manner as to permit lateral movement of the skid tube in relation to the platform upon landing and takeoff of the helicopter. The platform comprises a frame structure including a longitudinal portion and a transverse portion with a railing structure extending at least partially around the outer perimeter of the frame structure. The frame structure is mounted to an upper side of one of the skid tubes by a clamp assembly specifically designed to permit lateral movement of the skid tube in relation to the platform.

To provide additional load bearing support to the platform, a plurality of load supporting struts are connected to and extend between the platform and the helicopter fuselage. The supporting struts include a pair of inboard support struts connected at one end to the frame structure using a U-shaped attachment bracket with the opposite end of each inboard support strut being attached to a connecting plate mounted to the bottom surface of the fuselage.

The outboard support struts are each connected at one end to the frame structure using the same U-shaped attachment brackets. The opposite ends of the outboard support struts are each individually attached to one of two transversely extending cross arms mounted to the cabin floor. The cross arms are generally channel shaped and adapted to fit in covering relation to an existing rib structure extending transversely across the cabin floor. A plurality of connecting pins are used to secure the cross arms to the transverse ribs with the opposite ends of each cross arm extending outwardly from the door openings on opposite sides of the helicopter to facilitate attachment of the outboard support struts thereto.

In a preferred embodiment, the cargo and work platform assembly includes two independent platforms each being separately mounted on opposite sides of the helicopter to one of the two horizontal skid tubes.

Accordingly, it is an object of the present invention to provide a cargo and work platform assembly which is removably attachable to at least one, but preferably both sides of a helicopter horizontal skid tube assembly wherein either one or two platforms are independently mounted to one skid tube in such a manner as to provide for the lateral displacement of the skid tubes upon takeoff and landing.

It is an additional object of the present invention to provide a new and unique cargo and work platform assembly designed to maximize the external cargo carrying capacity outboard of the skid tubes of a helicopter while retaining a minimum resistance on the helicopter during flight.

It is still a further object of the present invention to provide for a maximum work area extending longitudinally along an outboard portion of the skid tubes of a helicopter including sufficient support structure to provide for maximum load carrying capacity.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the preferred embodiment of the platform assembly shown in connection on one side of a helicopter.

FIG. 2 is a perspective view of a preferred embodiment of the frame structure of the platform of the present invention.

FIG. 3 is a side view in partial section of the clamp assembly for mounting the platform to a skid tube.

FIG. 4 is an isolated top plan view of the keeper plate of the clamp assembly shown connected in slidable relation to a platform support surface.

FIG. 5 is an isolated side view in partial section of an attachment bracket for attaching the lower end of a support strut to the platform.

FIG. 6 is a perspective view of one preferred embodiment of a cross arm to be mounted to the cockpit floor of the helicopter.

FIG. 6A is a sectional view taken along line 6A—6A of FIG. 6.

FIG. 7 is an isolated perspective view of a connecting plate for connecting the upper ends of inboard support struts to the bottom of the helicopter fuselage.

FIG. 8 is a perspective view of another preferred embodiment of the cross arm.

FIG. 8A is a sectional view taken along line 8A—8A of FIG. 8.

FIG. 9 is a perspective view of the frame structure of an alternative preferred embodiment of the platform assembly of the present invention.

FIG. 9A is a section view along line 9A—9A of FIG. 9.

FIG. 10 a perspective view of the alternative preferred embodiment of the platform assembly shown in the raised position.

Like reference numerals refer to like parts throughout the several views of the drawings.

DETAILED DESCRIPTION OF THE PREFERRED EMBODIMENT

As seen in FIG. 1, the present invention is directed towards a cargo and work platform assembly generally indicated as 10, adapted for attachment to the side and bottom of a helicopter fuselage 12 and a corresponding skid tube 14. The platform assembly includes a platform 17 having a support surface 28 and a side railing 24 extending partially around the outer perimeter of the platform. In a preferred embodiment, the platform assembly includes two platforms each being mounted on opposite sides of the helicopter fuselage on one of two oppositely disposed skid tubes 14, 14'. Each platform is independently and separably mounted to one of the skid tubes by a clamp assembly 20 shown in detail in FIG. 3.

In a preferred embodiment of the present invention, the platform 16 comprises a frame structure, as illustrated in FIG. 2, including a plurality of interconnecting metal tubes having a rectangular, cross-sectional configuration. The platform 16 includes a longitudinal portion 17 dimensioned and configured to extend longitudinally along side a skid tube 14. The platform 16 further includes a transverse portion 18 generally configured to transversely extend at least partially across the undersurface of the helicopter fuselage 12. The frame structure of the platform 16 includes longitudinally extending tubes 19 and transversely extending tubes 19'. The frame structure further includes a railing structure 21 formed of the same metal tubes extending at least partially around the outer perimeter of the platform 16.

As seen in FIGS. 1, 3 and 4, a clamp assembly 20 is structured and configured so as to attach the platform to the top surface of the skid tube while allowing lateral movement of the skid tube in relation to the platform. The clamp assembly includes a clamp body 22 dimensioned and configured to surround the skid tube in mounting relation thereto. The clamp body further includes two upwardly extending prongs 24 and 24' adapted for connection to a keeper assembly 26 disposed on a support surface 28 of the platform 10.

The keeper assembly includes a plate 30 disposed on an upper side of the support surface 28 and connected to the upper ends of the prongs 24 and 24' thereby mounting the platform 10 to the skid tubes 14. The plate 30 is specifically dimensioned to overlie an elongate slot 32 wherein the plate has a sufficiently greater width than the slot 32 preventing the plate from passing therethrough. With the prongs 24 and 24' extending up through the slot 32 in connection with the plate 30 by a pair of nuts 21 and 21', the skid tube 14 is permitted to move laterally, as indicated by the directional arrow 34, in response to a force exerted on the skid tube assembly during takeoff and landing. The clamp assembly further includes a slide plate 27 disposed in sliding relation on a lower surface of the platform 28 in partially covering relation to the slot 32. The slide plate 27 is generally configured so as to have the same overall dimensions as the keeper plate 30 and includes apertures formed therein for passage of the prongs 24 and 24' therethrough. A pair of fastening nuts 25 and 25' are affixed on the prongs 24 and 24' just below the slide 27 and are threadably movable along the length of the prongs 24 and 24' respectively so as to force a skid tube securing plate 23 downwardly against one of the skid tubes 14 or 14' securing the clamp assembly 20 thereto.

The platform 16 is further secured to the helicopter fuselage 12 by a plurality of support struts including outboard support struts 40 and 40' and inboard support struts 42 and 42', as shown in FIG. 1. Each of the support struts 40, 40', 42 and 42' is connected at one end to the frame structure of the platform 16 by a U-shaped connecting bracket 46, as shown in FIG. 5. The U-shaped bracket is specifically dimensioned to extend upwardly through the frame structure in surrounding relation to a transverse tube 19' of the frame structure. Extending upwardly and projecting from the support surface 28 of the platform 16 are two free distal ends 47 and 47' being sufficiently spaced apart for receipt of an end of a support strut 40, 40', 42 or 42' therebetween. The support strut 40, as seen in FIG. 5, is secured to the bracket 46 by a connecting bolt 49 extending through the upstanding ends 47 and 47' and the support strut lying therebetween. Additionally, a connecting bolt 48 is used to secure the bracket 46 to the transverse tube 19 of the frame structure.

The upper opposite end of the outboard support struts 40 and 40' are connected to a cross arm 52 mounted to the cabin floor of the helicopter. In the preferred embodiment, two cross arms 52 and 52' are mounted transversely across the cabin floor secured thereto a connecting pin extending through apertures 54 formed in the cross arms. To facilitate attachment of the outboard support struts 40 and 40', the cross arms are of a sufficient length so as to extend outwardly from a door opening 56 of the helicopter. As seen in FIG. 6A, the cross arm 52 has a channel like configuration adapted to fit over transversely extending ribs formed on the cabin floor. Additionally, the channel like configuration of the cross arm 52 further facilitates attachment of the outboard support struts 40 and 40' wherein the end of the support struts are dimensioned to fit between downwardly extending sides 53 and 53' of the cross arm where they are attached thereto by a connecting bolt 58.

In another preferred embodiment of the present invention, the cross arm 52 comprises two portions 52A and 52B disposed in telescopically extendable relation, as indicated by the directional arrows 59 and 60 in FIG. 8. The overall length of the cross arm 52 can be adjusted by slidably moving the sections 52A and 52B with respect to one another wherein they can be locked into a fixed position by locking pins 62 and 63 dimensioned to pass through a plurality of apertures 65 and 65' formed in the sections 52A and 52B respectively. The cross arm 52 is specifically structured to be mounted in overlying relation to one of a plurality of transversely extending ribs 70 formed on the cabin floor 72 of the helicopter as shown in FIG. 8. Each of the sections 52A and 52B of the cross arm 52 includes a locking slot 74 and 74' dimensioned and angled so as to engage locking pins 77 and 77' respectively as the cross arm 52 is placed in covering relation to the transverse rib for mounting thereto.

With reference to FIG. 1, it is seen that there are two sets of attachment brackets on the longitudinal portion 17 of the platform 16 to accommodate varying lengths and alternate positioning of the outboard support struts 40 and 40' connecting between the platform 16 and the cross arms 52 and 52'.

The inboard support struts 42 and 42' are connected to the frame structure of the platform 16 using the U-shaped attachment brackets 46 in a similar manner as the outboard 23 support struts 40 and 40'.

The upper ends of the inboard support struts 42 and 42' are connected to a connecting plate 80 mounted to the bottom of the fuselage 12 of the helicopter. In a preferred embodiment, the connecting plate is of an H-shaped configuration including four channeled arms 81, 82, 83 and 84 extending transversely outward from a center portion 85. The center portion 85 includes a plurality of apertures 86 to facilitate mounting to a hard point on the bottom of the fuselage 12. In a preferred embodiment of the present invention, two platforms would each be independently mounted to oppositely disposed skid tubes 14 and 14' wherein four inboard support struts 42, 42', 42" and 42'" would extend upwardly from the platforms with two of the inboard support struts 42 and 42' connecting to one side of the connecting plate 80 and the other two inboard support struts 42" and 42'" extending upwardly from the other platform for connection to an opposite side of the connecting plate 80. Each of the inboard support struts are specifically dimensioned so as to fit within the channeled construction of the transversely extending arms 81, 82, 83 and 84. Each of the transversely extending arms includes a plurality of apertures as at 88 disposed in linear orientation along the length of the arms so as to accommodate varying lengths of the inboard support struts as well as required adjustments.

A second preferred embodiment of the present invention is shown in FIGS. 9, 9A and 10 and includes a foldable platform assembly 100 adapted to be mounted to the skid tubes 14 and 14' in a similar manner as the platform assembly in FIG. 1. The platform assembly in FIG. 9 includes a frame structure 110 having longitudinally extending support tubes 119 and transverse extending support tubes 119'. A plurality of hinges 125 are mounted at several intersections of the longitudinal support tubes 119 and transverse support tubes 119' as shown in FIG. 9. In this manner, the platform assembly is adapted to be folded upwardly to a secured position as shown in FIG. 10 so as to substantially reduce the amount of drag during forward flight of the helicopter. Additionally, the reduced drag, in turn, reduces the amount of fuel consumption, thereby enabling the aircraft to remain airborne for a substantially longer overall period of time. When lowered to an operable position, a plurality of support inserts 130 therein are adapted to be slidably received within the transverse support tubes 119' along an entire interior length thereby providing additional transverse support of the platform assembly, reinforcing the hinged areas.

A plurality of securing pins 140 are adapted to be inserted through the transverse support tube 119 and the correspondingly positioned support inserts 130 so as to secure the support insert 130 within a transverse support tube 119'.

As shown in FIG. 10, the platform assembly of FIG. 9 is adapted to be folded upwardly into a stored position during forward flight of the helicopter thereby substantially reducing the amount of drag exerted thereon. To secure and maintain the foldable platform 100 in a stored position, a securing link 150 is connectable between attachment brackets 146 on the platform 110 and the transverse cross arms 152 and 152' mounted to and extending across the cabin floor, thereby effectively locking the platform in a raised, stored position for extended forward flight.

Now that the invention has been described,

What is claimed is:

1. For use on a helicopter having a pair of oppositely disposed parallel skid tubes extending longitudinally below a helicopter fuselage, a cargo platform assembly adapted for attachment to at least one of the skid tubes and the helicopter fuselage, said assembly comprising:

a frame structure including a plurality of substantially rigid, sufficiently strong elongate tubes interconnecting with one another forming a longitudinal portion, a transverse portion, and a railing extending at least partially around an outer perimeter of said frame, said elongate tubes include metal tubes having a rectangular cross-sectional configuration, said metal tubes being of sufficient strength to support a substantial load placed on a support surface, said support surface mounted in substantially covering relation to an upper side of said frame structure defining a platform, mounting means for mounting said frame structure to at least one of the skid tubes, said mounting means structured to permit lateral movement of the skid tube with respect to said frame structure, platform support means connecting in supporting relation between said frame structure and the fuselage of the helicopter, a cross bar mounted to and extending transversely across a cabin floor of the helicopter, said cross bar including a channel configuration adapted to fit in mounting, covering relation to a transversely extended rib on the cabin floor, each opposite end of said cross bar further being dimensioned and configured to adaptively receive one end of an outboard support structure for connection thereto as a means for added support to the platform assembly, said cross bar including a plurality of connecting pins each being adapted to pass through said cross bar and said transverse rib for securing said cross bar thereto, and said cross bar includes two telescopically extended portions structured and configured to permit varied adjustment of the length of said cross bar.

2. An assembly as in claim 1 wherein said support surface comprises a metal perforated material mounted to the upper side of said frame structure.

3. An assembly as in claim 1 further including two frame structures each being mounted to one of the oppositely disposed skid tubes such that the platform assembly is disposed on both sides of the helicopter.

4. An assembly as in claim 1 wherein said frame structure, support surface and at least a portion of said platform support means are formed of fiberglass.

5. An assembly as in claim 1 wherein said frame structure, support surface and at least a portion of said platform support means are formed of kevlar.

6. An assembly as in claim 1 wherein said frame structure, support surface and at least a portion of said platform support means are formed of titanium.

7. An assembly as in claim 1 wherein said frame structure further includes longitudinally extending tubes and transversely extending tubes.

8. An assembly as in claim 1 wherein said railing on said frame structure includes siding mounted thereto defining sidewalls extending at least partially around the outer perimeter of said frame structure.

9. An assembly as in claim 7 wherein said support surface comprises a solid sheet of material of substantial thickness mounted to the upper side of said frame structure in substantially covering relation thereto.

10. An assembly as in claim 8 wherein said siding comprises solid sheets of materials mounted to said railing to define said sidewalls.

11. An assembly as in claim 8 wherein said siding comprises a metal perforated material mounted to said railing to define said sidewall structure.

12. An assembly as in claim 7 wherein said mounting means includes a clamp structure including a clamp body dimensioned and configured to at least partially surround a skid tube in engaging relation thereto and having a pair of upwardly extending prongs adapted for connection with a keeper assembly disposed on said support surface in slidable relation thereto.

13. An assembly as in claim 12 wherein said mounting means further includes at least one elongate slot formed in said support surface extending in transverse, overlying relation to the skid tube and configured to allow said upwardly extending prongs of said clamp body to pass through for attachment with said keeper assembly.

14. An assembly as in claim 13 wherein said keeper assembly further includes a plate disposed in covering relation to the width of said elongate slot such that an underside of said plate is slidably disposed on said support surface with said clamp structure and the skid tube being transversely movable in relation to said frame structure and support surface.

15. An assembly as in claim 7 wherein said platform support means includes a plurality of support struts including a pair of inboard support struts and a pair of said outboard support struts.

16. An assembly as in claim 15 wherein said outboard support struts are connected at opposite ends between said longitudinal portion of said frame structure and said cross bar mounted to and extending transversely across the cabin floor of the helicopter.

17. An assembly as in claim 15 wherein said inboard support struts are connected at opposite ends between said transverse portion of said frame structure and a bottom surface of the fuselage.

18. An assembly as in claim 15 wherein said support struts include at least one aperture extending transversely through each opposite end to facilitate bolted attachment to said frame structure and the helicopter.

19. An assembly as in claim 18 wherein said platform support means further includes a plurality of U-shaped attachment brackets, each being adapted to fit around one of said elongate tubes of said frame structure such that two opposing leg portions of each of said brackets extend upwardly through said support surface for attachment with one end of a support strut.

20. An assembly as in claim 18 wherein said platform support means further includes a connecting plate mounted to the bottom surface of the fuselage, said connecting plate having an H configuration including four channeled arms extending transversely outward from a center portion, each of said channel arms being dimensioned and configured to adaptively receive one end of an inboard support strut for connection thereto.

21. For use on a helicopter having a pair of oppositely disposed parallel skid tubes extending longitudinally below a helicopter fuselage, a foldable cargo platform assembly adapted for attachment to at least one of the skid tubes and the helicopter fuselage, said assembly comprising:

a frame structure including a longitudinal portion, a transverse portion and a railing extending at least partially around an outer perimeter of said frame structure.

a support surface mounted in substantially covering relation to an upper side of said frame structure defining a platform, mounting means for mounting said frame structure to at least one of the skid tubes, said mounting means structured to permit lateral movement of the skid tubes with respect to said frame structure, platform support means connecting in supporting relation between said frame structure and the fuselage of the helicopter, a plurality of substantially rigid, sufficiently receive one end of an outboard support structure for connection thereto as means for added support to the platform assembly, said cross bar including a plurality of connecting pins each being adapted to pass through said cross bar and said transverse rub for securing said cross bar thereto, and said cross bar includes two telescopically extended portions structured and configured to permit varied adjustment of the length of said cross bar.

* * * * *